April 5, 1927.  
K. WOLFF  
1,623,648  
MOTOR VEHICLE IGNITION AND LIGHTING SYSTEM  
Filed Jan. 11, 1922    3 Sheets-Sheet 1

Inventor.  
Karl Wolff  
By Lawrence Langner  
Attorney

April 5, 1927.

K. WOLFF 1,623,648

MOTOR VEHICLE IGNITION AND LIGHTING SYSTEM

Filed Jan. 11, 1922   3 Sheets-Sheet 2

Inventor
K. Wolff
by Lawrence Langner
Atty.

April 5, 1927.  K. WOLFF  1,623,648
MOTOR VEHICLE IGNITION AND LIGHTING SYSTEM
Filed Jan. 11, 1922  3 Sheets-Sheet 3
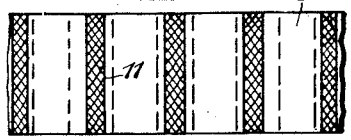
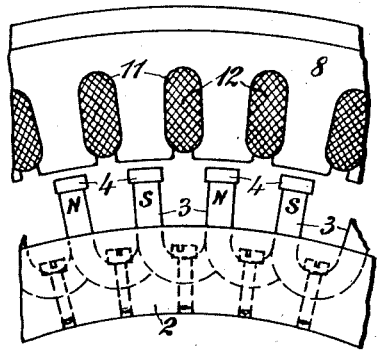
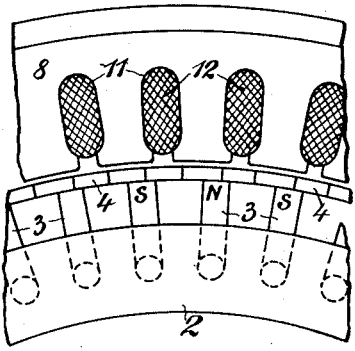
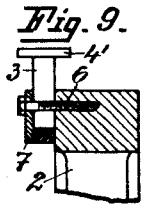
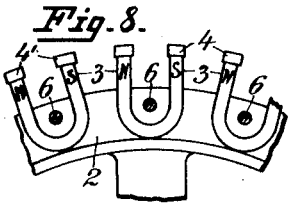
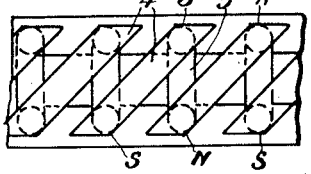
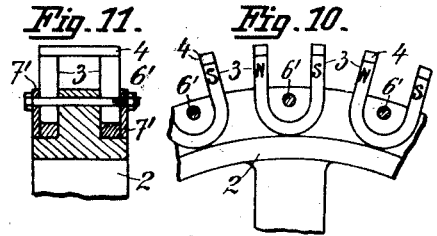
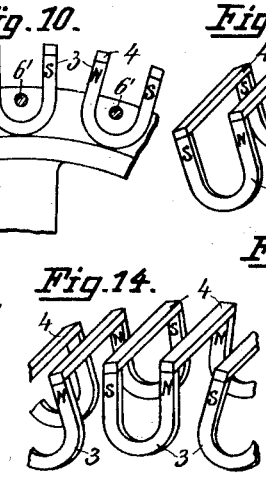
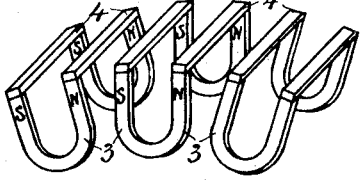
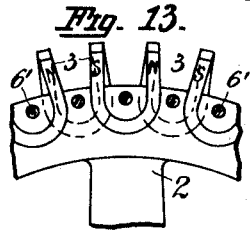
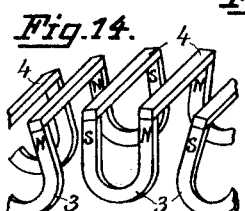
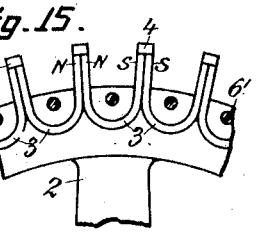
Inventor:
Karl Wolff
By Lawrence Langner
Attorney Patented Apr. 5, 1927.

1,623,648

UNITED STATES PATENT OFFICE.

KARL WOLFF, OF MUNICH, GERMANY.

MOTOR-VEHICLE IGNITION AND LIGHTING SYSTEM.

Application filed January 11, 1922, Serial No. 528,524, and in Germany October 29, 1920.

This invention has reference to improvements in electric, and particularly magneto-electric systems for the illumination and ignition of motor vehicles, and it is particularly adapted for operation in connection with low priced passenger cars, motor-driven freight cars and the like, and it is advantageously distinguished from the previous art by its simplicity of construction and by doing away with the necessity of relays, fuses, contacts, and of parts sliding upon each other, and which are usually subject to wear and destruction, and therefore require constant attention and repairs.

In accordance with this invention the current employed for illumination and ignition is generated in a magneto-electric machine the rotor of which is provided upon its outer surface with a plurality of equidistant permanent magnets of alternating north- and south-polarities, while the stator is preferably segment-shaped and is provided with a winding of high self-induction. A machine of this kind which does not possess any slip or collector rings or the like, so as to be particularly adapted for the operation of motor vehicles and the like in view of its simplicity of construction, furnishes alternating current which may be taken off directly from a stationary stator winding, and reaches the tension required for ignition, as soon as the internal combustion engine is started, and does not require the arrangement of special fuses, automatic switch-out devices or the like, inasmuch as even at increasing speeds of revolution any increase of the tension to a degree that might become dangerous to reflector lamps is prevented in view of the high value of the self-induction. The new system is, moreover, distinguished by the fact that a transformer is inserted between the lamps and the stator winding, said transformer furnishing the high tension required for ignition, and being provided with a plurality of primary coils through which the lamp conduits are passed and which take off the current directly from the stator windings. The primary coils and those parts of the stator winding from which the corresponding lamps are provided with current are connected in parallel when the reflector lamps are operated, while these parts are connected in series when the lamps are cut out.

The new system according to this invention is also distinguished by the fact that the tension required for the operation of the lamps is furnished immediately upon the starting of the driving engine, so as to dispose with the necessity of special batteries and the like. It merely possesses a switching mechanism for the cutting in and out of the lamps, and it does not require any additional circuit closing devices, relays and the like, whereby great safety of operation is secured. The mounting of the new system in position can be effected at low cost, so as to adapt the invention among other uses to the cheaper grades of vehicles.

The several features of the invention will appear from the following specification and claims, in connection with the drawings forming a part of this specification.

In the drawings:—Figure 1 is a switching diagram with a representation of the general arrangement of the means for the generation of the illuminating and igniting current, and also showing the connection of the preferably employed magneto-electric medium frequency machine with permanent magnets. Figure 1$^a$ is a diagrammatic showing of the connections in the transformer.

Figure 3 is a front view of part of the stator and of the rotor corresponding to the machine shown in Figure 1, and on an enlarged scale.

Figure 4 is a plan view showing the grooves of the stator, as seen from the bottom side of Figure 3.

Figure 2:
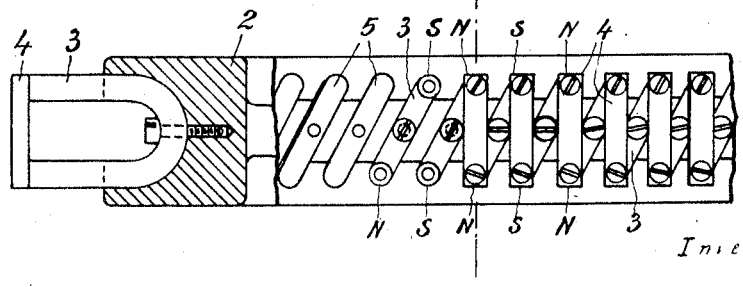
Figure 2 is a plan view with parts in section, showing the rotor of the machine with the permanent magnets mounted at its periphery on an enlarged scale.
Figure 1A:
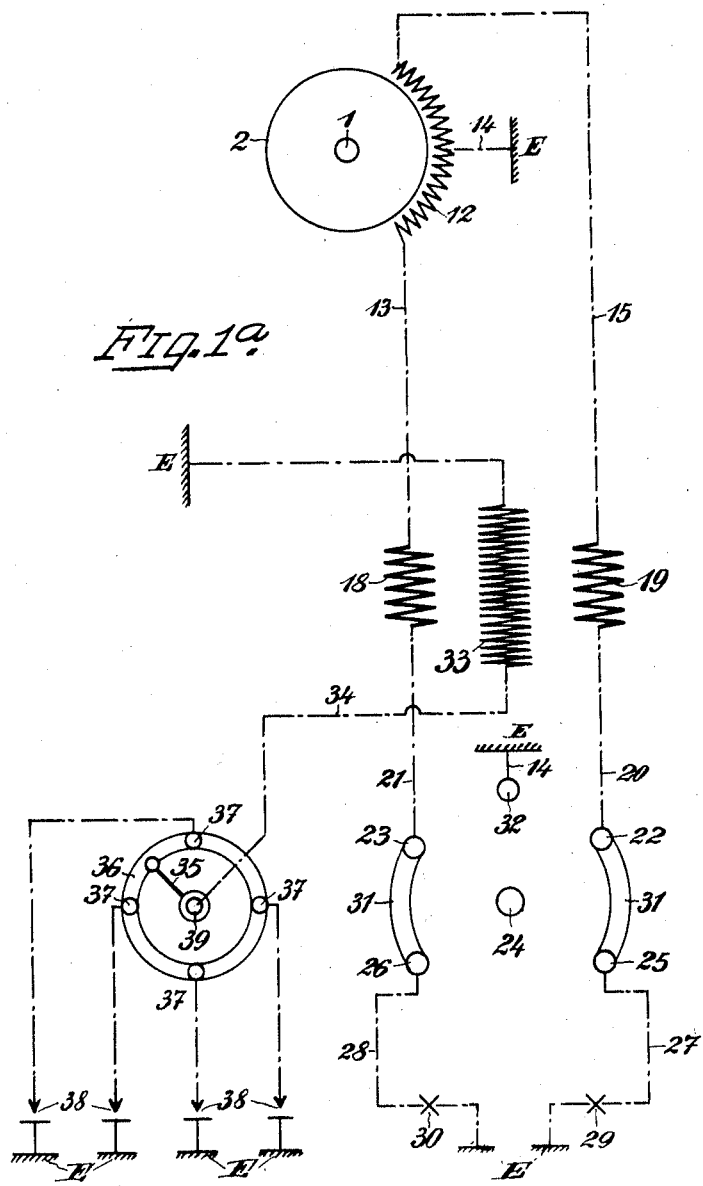

Figures 5, 6, and 7 are respectively plan views and a front view, of a modified form of construction corresponding to Figures 2 to 4, showing the horse shoe magnets to be mounted in radial planes relatively to the rotation axis, the pole shoes being arranged at an angle, while the stator is provided with correspondingly inclined grooves.

Figures 8 and 9 are respectively sectional and front views illustrating another modified form of construction, showing a different manner of securing the permanent magnets upon the outer surface of the rotor.

Figures 10 and 11 are respectively sectional and front views illustrating another manner of securing the permanent magnets upon the periphery of the rotor.

Figure 12 is a perspective view of the magnets and pole shoes corresponding to Figures 10 and 11.

Figure 13 is a front view of another modified form of construction and arrangement of the magnets upon the outer surface of the rotor.

Figure 14 is a perspective view of the arrangement shown in Figure 13.

Figure 15 illustrates another modified arrangement of the magnets upon the outer surface of the rotor.

In the drawings:—1 is a rotary shaft, preferably the motor shaft itself upon which a rotating disc 2, preferably the fly wheel of the internal combustion engine, is mounted, the said disc preferably consisting of material of magnetic conductivity, such for example as cast iron or cast steel. Upon the periphery of the disc 2 permanent magnets 3 are arranged equidistant from each other, and are preferably formed by so-called horse shoe magnets. The like poles of adjacent magnets are connected to each other by pole shoes 4. This results in the advantage that the magnets are mechanically connected to each other, and it also results in a magnetically advantageous structure, inasmuch as by means of the arrangement of such pole shoes each pair of two magnets is condensed into one pole, it being well known that magnets, in view of the magnetic compensation thereby obtained, will be prevented from losing their magnetism as readily as when employing the magnets separately.

In the embodiment of this invention shown, by way of example in Figures 1 to 4 of the drawing the magnets 3 are mounted in inclined grooves 5 of the fly wheel 2. The inclination of the grooves 5 is such that the line of connection between two similar poles of two succeeding magnets is parallel to the shaft 1, so that the pole shoes in this form of the invention are parallel to the shaft 1. As a result thereof the north poles and south poles respectively of two succeeding magnets are arranged on different sides of a plane through the center of the fly wheel rim and at right angle to the rotation axis (Figure 2).

The form of construction illustrated in Figures 5 to 7 is different from the construction first described, in having the magnets 3 mounted in planes radially arranged with relation to the axis 1. The arrangement is otherwise the same, that is to say, the north poles and south poles alternate with each other upon both sides of the fly wheel 2, and the poles of like character of two succeeding magnets are connected by pole shoes which, as indicated in Figure 6, are angularly arranged in this case.

In the modified forms of construction illustrated in Figures 8 to 15 the magnets are laterally arranged upon the fly wheel rim in such a manner that part of the magnets is magnetically short circuited by the magnetic conductivity of the fly wheel. Besides the simplicity of mechanical construction this arrangement presents the advantage that the several magnets are prevented from being subject to alterations of their magnetism by strong magnetic vibrations. In the form of construction according to Figures 8 and 9 the horse shoe magnets 3 are secured to the rim of the fly wheel 2 by means of screws 6 and an inserted disc or washer 7. In this form of construction the pole shoes 4' are secured to the ends of each forked magnet, so that in this modification there is no connection of the similar poles of succeeding magnets by means of pole shoes. In the form of construction according to Figures 10 to 12 the magnets 3 are mounted upon the periphery of the fly wheel in recesses of the same, and are retained in position by means of end-to-end bolts 6' and retaining discs 7'. In the form of construction of Figure 12 magnets are arranged opposite to each other on both sides of the fly wheel tire, so that similar poles register with each other, and may be connected by pole shoes 4, exactly as shown with reference to the arrangement according to Figures 2–4. This arrangement presents great advantages as regards the efficiency of the magnets, because, as is well known, a greater flow of magnetic flux is obtained by substituting two smaller magnets for one larger magnet, and coupling said magnets by a pole shoe.

The form of construction according to Figures 13 and 14 is differentiated from the construction of Figures 10 to 12 merely by the fact that the magnets 3 are staggered on both sides of the fly wheel rim for the distance of half the width of a magnet, so as to produce a spiral of magnets and pole shoes which extends around the entire periphery of the fly wheel (Fig. 14), while in the form of construction according to Figures 10 to 12 each two confronting magnets with the corresponding pole shoes constitute a closed magnetic circuit.

In the form of construction according to Figure 15 each series of four magnets which are arranged in confronting pairs, are connected to each other by common pole shoes 4, by which means a still more favorable magnetic action is produced.

In a preferred form of construction the magnets are preferably arranged upon the periphery of the fly wheel of the engine for operating the vehicle, so as to dispense with a special supporting disc, and because this kind of arrangement may also be applied in a great many cases to already existing fly wheels of engines.

Figure 1:
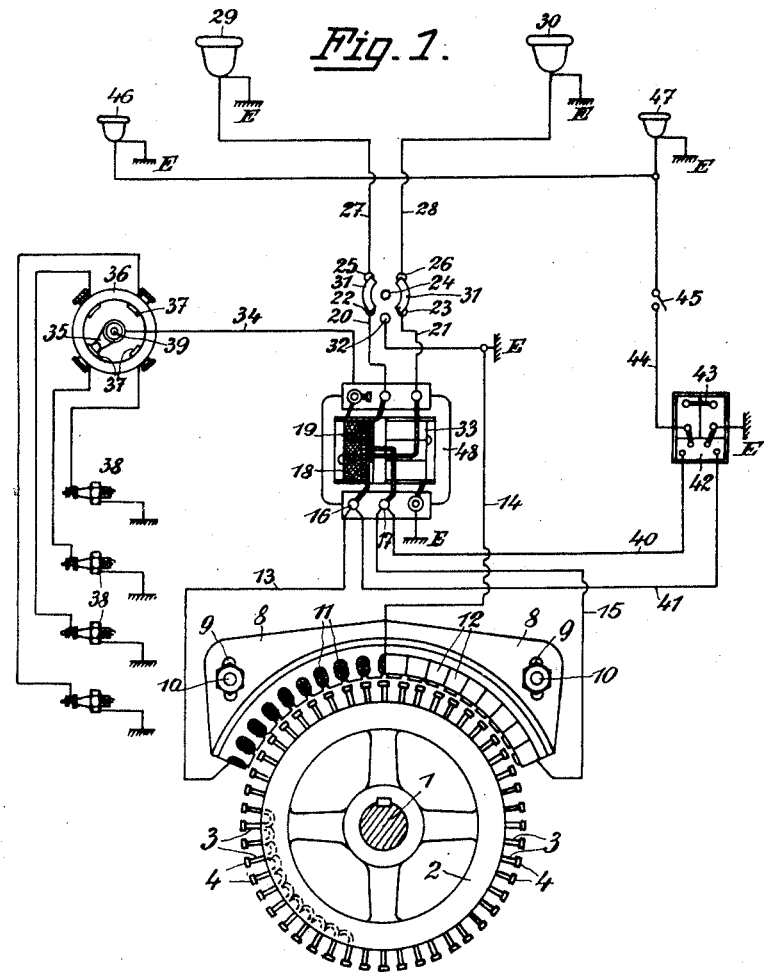

The rotor which is formed by the fly wheel 2 and the permanent magnets 3 cooperates with a stator 8. This stator is preferably segment shaped, so that it does not surround the rotor on its entire periphery as is the case with the well known magneto or dynamo-electric machines. This arrangement is for the purpose of preventing the dynamo electric engine from furnishing a larger yield with a higher number of revolutions of the rotor 2, than would be required for the purposes of illumination and ignition; and it is also particularly adapted for the construction of a stator of low cost that is very efficiently journaled. While in machines as ordinarily constructed the sheet metal rings constituting the stator have to be cut from large metal sheets which entails a very large loss of material, every metal sheet may be utilized to greatest advantage with the minimum of waste by making the stator of segment shape. Furthermore, the segment shaped construction of the stator makes it possible to control the size of the air gap between stator and rotor and to adjust the same easily, and allows the employment of a very narrow air gap, as compared with the well known machines where it is not possible to go below a certain minimum size of air gap in view of the wear of journals and shaft. A segment shaped stator, however, may be adapted to any change of position of the rotor which results from wear, by suitable adjustment. The stator 8 illustrated in Figure 1 is, therefore, provided with longitudinal slots 9 through which screws 10 are passed for adjustably attaching the stator to its support. Then, the construction of the segment shaped stator presents the advantage of great economy of space so that it may be easily mounted in existing vehicles in view of the small space required.

The stator 8 is provided on its inner surface confronting the rotor with grooves 11 as is usual in which the windings for the stator are secured, as shown at 12. According to the arrangement of the magnets 3 upon the periphery of the fly wheel 2 the stator grooves 11 are correspondingly arranged as shown in Figures 4 to 7 of the drawings, being either parallelly or angularly arranged with relation to the axis 1, so as to be parallel to the pole shoes 4.

The combination of rotor and stator hereinbefore described constitutes an alternating current machine possessing neither slip rings nor collectors, nor any special exciting mechanism, and which upon the starting of the driving engine will immediately furnish the current required for the operation of the lamps and for the ignition of the engine. The number of magnets is preferably so adjusted that the dynamo machine possesses medium frequency, that is to say, more than one hundred and less than ten thousand cycles, and for practical working from 100 to 1000 cycles a second. This arrangement has the advantage that the alternating current produced by the machine may easily be transformed upwards to the ignition voltage desired.

A very important feature of the novel illuminating and igniting system resides, moreover, in the fact that the stator winding is provided with a sufficiently high value of self-induction as to keep the lamp current constant irrespective of variation of the number of revolutions. It is well known that, with a sufficiently high self-inductor of the stator winding, the watt-tension practically does not increase, while the wattless tension is absorbed by the self-induction of the winding. Hence, with a corresponding adjustment of the electric values the lamp tension remains constant in the most simple manner even upon a change in the number of revolutions, so that the lamps may be directly connected to the stator winding, without the necessity of inserting regulating devices or the like and without any danger of burning out the lamps. The machine illustrated in Figure 1 therefore possesses the important feature, not admitting of clear illustration in the drawing, that the coils 12 are provided with an exceedingly large number of windings, that is to say with such an amount of windings as to be in excess of what is actually necessary for the generation of the required lamp tension, and which makes it possible to produce a self-induction sufficient for keeping the lamps under a constant tension. By the proper selection of the inductive resistance as compared with the ohmic resistance which latter is substantially represented by the incandescent lamps, it becomes possible to produce a nearly constant current and to obtain constant tension at all changes in number of revolutions, without it being necessary to resort to the insertion of a special throttling coil.

In accordance with Figure 1 it is intended, for example, to feed the current from the magneto-electric machine to two main reflector lamps. The stationary stator winding 12 is branched off at three points by conduits 13, 14, 15, the conduits 13 and 15 passing through the terminals 16 and 17 to the primary coils 18 and 19 of a transformer 48 for the generation of the high tension required for the ignition. Each reflector lamp is, therefore, combined with a transformer coil which is in series with the corresponding section of the stator through the corresponding conduits 13 and 15 respectively, and the common return conduit of both lamps, when the lamps have been cut into circuit, as shown in Figure 1. The primary coils are connected by means of conduits 20, 21 to the terminals 22, 23 of a rotary switch 24 the contacts 25, 26 of which by means of the conduits 27, 28 are connected to the lamps 29, 30, which are grounded at E and which are to be employed as the reflectors of the vehicle. The switch 24 is provided with two contact springs 31 which, in the position shown in Figure 1, connect the contacts 22 and 25, and 23 and 26, respectively, thereby switching in the illuminating current to the lamps 29 and 30.

The conduit 14 leads to a contact 32 which in the position shown in Figure 1 of the drawing has no further connection and is grounded at E. Upon the rotation of the armature 2 a current is generated in the windings 12 so that in the position of the switch appearing from Figure 1, two circuits are established, one passing from the branching point of the conduit 13 on the winding 12, the terminal 16, primary coil 18, conduit 21, contacts 23, 31, 26 the conduit 28, the lamp 30, its earth connection E, the earth connection E of the conduit 14, and back to the stator through this conduit, while another circuit is formed through the conduit 15 from the other branching point of the winding 12, through the terminal 17, the primary coil 19, the conduit 20, contacts 24, 31, 25, the conduit 27, lamp 29, and over the ground E back to the stator by way of the conduit 14.

It appears from these diagrams that by this means the reflector lamps 29, 30 are completely independent of each other, so that one lamp is not interfered with if the other lamp should not operate. If two lamps were connected to the machine terminals in parallel, and one of the lamps should refuse to properly operate, the other lamp would also burn out immediately in view of the change of the outer resistance, and the thereby resulting increase of watt-tension, and all the light would go out suddenly. This inoperativeness would also occur, if the lamps were in series connection inasmuch as in this case the circuit is interrupted when one of the lamps fails. By reason of the fact that each lamp is directly connected to a portion of the stator winding by means of a special conduit, so that the stator winding possesses branching points for taking off current which correspond to the number of lamps, it becomes possible to effect the cutting out of the lamps without special fuses or the like or safety devices.

By turning the switch 24 through an angle of ninety degrees from the position illustrated in Figure 1 the lamps 29 and 30 are grounded, and the previously independent primary coils 18, 19 which were in series connection with the corresponding sections of the stator, are now grounded. The insertion of the primary coils of the transformer between stator and the lamps produces, moreover, the effect of contributing to the tension of the lamps being kept constant. It is moreover of great advantage that in the cutting-out of the lamps 29 and 30 the primary coils of the transformer be automatically switched to ground. It is obvious that with a parallel connection the efficiency of the magneto-electric machine would become considerably reduced, inasmuch as the transformer produces a comparatively large wattless load which acts unfavorably upon the potential difference of the machine. In consequence of the said connection of the primary coils, when the internal combustion engine is started up, the immediate generation of the necessary igniting tension is, therefore, greatly facilitated.

The secondary coil 33 of the transformer 48 is grounded at one end, while the other end is connected by means of the conduit 34 to the rotary distributing lever 35 of a distributor 36 the contacts 37 of which are connected in the usual manner to the igniters 38 of the engine. This kind of arrangement becomes possible, because the magneto-electric machine already possesses sufficient energy upon the starting of the engine, and because the combination with the high tension transformer furnishes immediately the tension required for ignition. The distributor may be mounted directly upon the sparking shaft 39 of the internal combustion engine, inasmuch as the number of revolutions of the distributor must be the same as that of the sparking shaft. In view of this fact, a great simplification of construction is effected as compared with the usual standard igniting magnets where the inductor ordinarily has a different number of revolutions than the sparking shaft, so that it is necessary to operate it by means of a corresponding transmission gear.

The details of the internal combustion engine are not shown in the drawings as they are not essential for the present invention. It will be sufficient to point out that the shaft 1 may for instance constitute the shaft of the engine, and the shaft 39 the sparking shaft of the engine, and that the two shafts may operate for example with the usual transmission ratio of 1:2.

The illuminating system diagrammatically indicated in Figure 1 is only adapted to provide current for the reflector lamps 29 and 30 when the driving machine is in operation. In order to at least obtain light for ascertaining the position when the engine is not running, a rectifier 43 is connected to the terminals 16 and 17 through the conduits 40, 41, said rectifier converting the alternating current of the dynamo machine into direct current, and being connected to a battery 42. The battery is grounded on one side while on the other side it is connected by means of a conduit 44 with a switch 45, and then to the searching or position lights 46, 47 which are likewise grounded. If an electrolytic rectifier is used the same constitutes at the same time a safety device which prevents the flowing back of current from the storage battery 43 or the like into the stator windings.

It should be pointed out that, as regards the grounding or earth connection of conduits and the like above referred to a connection with the metal frame of the vehicle is understood, which provides the return passage for the currents. Furthermore, it is obvious that within the meaning of the specification and claims a number of the details and arrangements described and illustrated may be changed or modified without deviating from the spirit of this invention. It may be pointed out in particular that the invention obviously also refers to a system in which the ignition is effected in the usual manner by means of a special igniting machine or where the arrangement of special conduits and of the other instrumentalities for the searching lights or position lamps has not been provided for.

What I claim is:—

1. A system for ignition and illumination of motor driven vehicles, comprising, an alternating current generator driven by the vehicle motor and designed to supply medium frequency current at the cranking speed of the motor, reflector lamps, a rotary spark distributor, and a transformer having its primary winding connected both to the stator winding of the generator and to the reflector lamps, and its secondary winding connected to the rotary spark distributor, the transformer constituting the sole means for bringing the generator current up to ignition tension.

2. In a system of the character described, a magneto-electric machine having its periphery provided with permanent magnets, a wound stator, a connection grounding the stator, a plurality of reflector lamps, a spark distributor, a transformer having a plurality of primary coils, and a secondary coil, a connection between the spark distributor and the secondary coil, conductors and the switch connecting the primary coils of the transformer and the reflector lamps and stator coils, the switch connecting the transformer primary coils to ground when cutting the reflector lamps out of operation and connecting them in separate circuits when cutting the reflector lamps into operation, substantially as described.

3. In a system of the character described, a magneto-electric machine, comprising, a rotor having its periphery provided with permanent magnets, and a wound stator having a plurality of separate sections, a spark distributor, reflector lamps, and a transformer, the primary winding of which comprises a plurality of coils connected each with a section of the stator and also with a reflector lamp, the secondary of the transformer being connected to the spark distributor, substantially as described.

4. In a system of the character described, a magneto-electric machine, comprising, a rotor having its periphery provided with permanent magnets, and a wound stator having a plurality of separate sections, a connection grounding the sections, a plurality of reflector lamps, a spark distributor, a transformer, the primary winding of which comprises a plurality of coils connected each with a section of the stator and with a reflector lamp and the secondary of which is connected to the spark distributor, and a switch, for disconnecting the reflector lamps from the magneto-electric machine and grounding the primary coils of the transformer, substantially as described.

In testimony whereof I affix my signature.

KARL WOLFF.